US012475121B2

(12) United States Patent
Kamali et al.

(10) Patent No.: US 12,475,121 B2
(45) Date of Patent: Nov. 18, 2025

(54) HYBRID COST MODEL FOR EVALUATING QUERY EXECUTION PLANS

(71) Applicant: International Business Machines Corporation, Armonk, NY (US)

(72) Inventors: Seyed Mohammad Amin Kamali, Orleans (CA); Vincent Corvinelli, Mississauga (CA); Calisto Zuzarte, Pickering (CA); Brandon Lewis Frendo, Markham (CA); Vasiliki Kantere, Ottawa (CA); Ning Wang, Ottawa (CA)

( * ) Notice: Subject to any disclaimer, the term of this patent is extended or adjusted under 35 U.S.C. 154(b) by 0 days.

(21) Appl. No.: 18/507,299

(22) Filed: Nov. 13, 2023

(65) Prior Publication Data
US 2025/0156417 A1   May 15, 2025

(51) Int. Cl.
*G06F 16/2453*   (2019.01)
(52) U.S. Cl.
CPC .............. *G06F 16/24542* (2019.01)
(58) Field of Classification Search
None
See application file for complete search history.

(56) References Cited

U.S. PATENT DOCUMENTS

| 2014/0214880 A1* | 7/2014 | Chi ................... G06F 16/2453 707/768 |
| 2020/0272667 A1 | 8/2020 | Ding et al. |
| 2020/0349161 A1* | 11/2020 | Siddiqui ............... G06N 20/10 |
| 2021/0286784 A1 | 9/2021 | Chen et al. |
| 2022/0300510 A1 | 9/2022 | Arnold et al. |

OTHER PUBLICATIONS

Akiba et al. "Optuna: A next-generation hyperparameter optimization framework." Proceedings of the 25th ACM SIGKDD international conference on knowledge discovery & data mining. 2019: 10 pages.
Anonymous, "Optimizing Join Enumeration by Predicting Expensive Joins," Jul. 14, 2022, An IP.com Prior Art Database Technical Disclosure, IP.com No. IPCOM000270553D, 4 pages.

(Continued)

*Primary Examiner* — Scott A. Waldron
(74) *Attorney, Agent, or Firm* — Cantor Colburn LLP; Teddi Maranzano

(57) ABSTRACT

Aspects of the disclosure include hybrid cost model-based techniques for evaluating query execution plans. A non-limiting example method includes inputting, to a plurality of base cost models including one or more learned cost models and a classic cost model, a query and a search space including a plurality of candidate query execution plans. Each base cost model outputs a predicted execution time or cost for each plan of the plurality of candidate query execution plans and a real execution time for each plan is determined. The method includes generating a training label including the query and a model of the base cost models having a highest correlation between the predicted and real execution times and training a query classifier on training data including the training label to predict which base cost model of the plurality of base cost models is a most suitable cost model for planning a given query.

14 Claims, 4 Drawing Sheets

(56) References Cited

OTHER PUBLICATIONS

Caruana et al., "Overfitting in neural nets: Backpropagation, conjugate gradient, and early stopping." Advances in neural information processing systems 13 (2000): 7 pages.
Damasio et al. "GALO: guided automated learning for re-optimization." Proceedings of the VLDB Endowment 12.12 (2019): 1778-1781.
Haritsa, Jayant R. "Robust Query Processing: Mission Possible." Proceedings of the VLDB Endowment 13.12. (2020): pp. 3425-3428.
Jin et al., "Sepia: estimating selectivities of approximate string predicates in large databases." The VLDB Journal 17 (2008): pp. 1213-1229.
Kingma et al., "Adam: a method for stochastic optimization." arXiv preprint arXiv:1412.6980 (2014): 15 pages.
Kipf et al. "Learned cardinalities: Estimating correlated joins with deep learning." arXiv preprint arXiv:1809.00677 (2018): 8 pages.
Krishnan et al. "Learning to optimize join queries with deep reinforcement learning." arXiv preprint arXiv:1808.03196 (2018): 19 pages.
Lakshmi et al., "Selectivity estimation in extensible databases-a neural network approach." VLDB. vol. 98. 1998: pp. 623-627.
Lakshminarayanan et al., "Simple and scalable predictive uncertainty estimation using deep ensembles." Advances in neural information processing systems 30 (2017): 12 pages.
Leis et al. "Cardinality Estimation Done Right: Index Based Join Sampling" Cidr. 2017: 8 pages.
Leis et al. "How Good Are Query Optimizers, Really?". Proceedings of the VIdb Endowment, 2015, 9(3): pp. 204-215.
Liu et al. "Efficient Learning with Pseudo Labels for Query Cost Estimation." Proceedings of the 31st ACM International Conference on Information & Knowledge Management. 2022: 10 pages.
Liu et al., "Cardinality Estimation Using Neural Networks," in: Proceedings of the 25th Annual International Conference on Computer Science and Software Engineering, CASCON '15. IBM Corp., Riverton, NJ, USA, (2015): pp. 53-59.
Liu et al., "Fauce: fast and accurate deep ensembles with uncertainty for cardinality estimation." Proceedings of the VLDB Endowment, 14(11), (2021): 1950-1963.
Marcus et al. "Bao: Learning to steer query optimizers." arXiv preprint arXiv:2004.03814 (2020): 16 pages.
Marcus et al. "Flow-Loss: Learning Cardinality Estimates That Matter," Proc. VLDB Endow. 14. (2021): pp. 1-17.
Marcus et al. "Neo: a learned query optimizer." arXiv preprint arXiv:1904.03711 (2019): 18 pages.
Marcus et al., "Deep Reinforcement Learning for Join Order Enumeration," in: Proceedings of the First International Workshop on Exploiting Artificial Intelligence Techniques for Data Management, AiDM'18. ACM, New York, NY, USA, (2018): p. 3:1-3:4.
Mou et al., "Convolutional neural networks over tree structures for programming language processing." Proceedings of the AAAI conference on artificial intelligence. vol. 30. No. 1. 2016: 7 pages.
Nambiar et al., "The Making of TPC-DS." VLDB. vol. 6. 2006: 10 pages.
Negi et al. "Flow-Loss: Learning Cardinality Estimates That Matter," Proc. VLDB Endow. 14. (2021): pp. 2019-2032.
Siddiqui et al, "Cost Models for Big Data Query Processing: Learning, Retrofitting, and Our Findings", SIGMOD, 2020, pp. 99-113.
Trummer et al., "SkinnerDB: Regret-Bounded Query Evaluation via Reinforcement Learning," SIGMOD '19. Association for Computing Machinery, Amsterdam, Netherlands, (2019): pp. 1153-1170.
Wang et al. "Are we ready for learned cardinality estimation?." arXiv preprint arXiv:2012.06743 (2020): 15 pages.
Wang, et al., "A Hybrid Cost Model for Evaluating Query Execution Plans", CASCON, 2023, 7 pages. (Grace Period Disclosure).
Wu et al. "Predicting query execution time: Are optimizer cost models really unusable?" IEEE 29th International Conference on Data Engineering (ICDE). IEEE, 2013: 12 pages.
Xu et al., "Learning to optimize federated queries," AiDM'19. Association for Computing Machinery, Amsterdam, Netherlands, (2019) pp. 1-7.
Yu et al. "Cost-based or learning-based? A hybrid query optimizer for query plan selection." Proceedings of the VLDB Endowment 15.13 (2022): 13 pages.
Yu et al., "Reinforcement Learning with Tree-LSTM for Join Order Selection," IEEE 36th Int. Conf. Data Eng. ICDE. (2020): pp. 1297-1308.
Marcus et al. "Bao: Making Learned Query Optimization Practical", SIGMOD '21: Proceedings of the 2021 International Conference on Management of Data, Jun. 18, 2021, pp. 1275-1288, https://doi.org/10.1145/3448016.345283.

* cited by examiner

HYBRID COST MODEL FOR EVALUATING QUERY EXECUTION PLANS

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURES: Ning Wang, et al., 2023. A Hybrid Cost Model for Evaluating Query Execution Plans. *Proceedings of CASCON (CASCON'23)*, 7 pages. Ning Wang, et al., Nov. 15, 2022. Exhibit displayed for A Hybrid Cost Model for Evaluating Query Execution Plans. *Weavesphere 2022 Conference.*

BACKGROUND

The present disclosure generally relates to relational database management, and more specifically, to computer systems, computer-implemented methods, and computer program products for providing a hybrid cost model for evaluating query execution plans.

A relational database management system (RDBMS) often relies on structured query language (SQL) to manage data stored in a relational database. An RDBMS may typically include single column statistics that are usually collected on individual columns in a so-called relation. A relation may include tuples and/or attributes that describe the relationship(s) and/or the defining feature(s) in a table or between tables in a relational database. For example, a relation can include data values on a table and the relational database may store the data values as relations or tables. A collection of relations or tables may be stored on a database as a relational model.

Queries can be executed against a relational database using an RDBMS. A query refers to a specific request or command issued to the RDBMS to retrieve, manipulate, and/or update data stored in a relational database. Queries allow users to interact with the database and to perform various operations such as retrieving specific records, filtering data based on certain criteria, aggregating information, joining tables, and modifying data. Queries are typically written using SQL, which provides a standardized syntax and set of commands to interact with the database.

While all query plans for a given query are equivalent in terms of their final output, each will vary in execution cost, which is the amount of time and resources needed to run a respective query. The cost difference across query plans can be several orders of magnitude large. Therefore, when a query is executed, a query optimizer (often itself a component/module of the RDBMS) analyzes the query and determines the most efficient execution plan. To determine the most efficient plan, the query optimizer examines alternative plans and searches for the cheapest one in terms of execution cost. The cheapest query plan is often referred to as the optimal query plan.

In a typical architecture, a query plan is constructed bottom-up by the plan operators as building blocks, with each operator associated with a certain estimated cost (e.g., an amount of hardware resources utilized, an elapsed time, etc.). The overall cost of a given plan is the accumulated cost resulting from all plan operators involved when suitably accounting for portions of the query that are executed (if, e.g., elapsed time is used to cost the query). To select an optimal query plan, a query optimizer uses a cost model to evaluate several alternative query plans in its search space. The plan with the minimum estimated cost is typically selected for executing the query.

SUMMARY

Embodiments of the present disclosure are directed to hybrid cost model-based techniques for evaluating query execution plans. A non-limiting example method includes inputting, to a plurality of base cost models including one or more learned cost models and a classic cost model, a query and a search space including a plurality of candidate query execution plans. Each base cost model outputs a predicted execution time or cost for each plan of the plurality of candidate query execution plans and a real execution time for each plan is determined. The method includes generating a training label including the query and a model of the base cost models having a highest correlation between the predicted and real execution times and training a query classifier on training data including the training label to predict which base cost model of the plurality of base cost models is a most suitable cost model for planning a given query.

Other embodiments of the present disclosure implement features of the above-described method in computer systems and computer program products.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the disclosure are apparent from the following detailed description taken in conjunction with the accompanying drawings in which:

Figure 1:
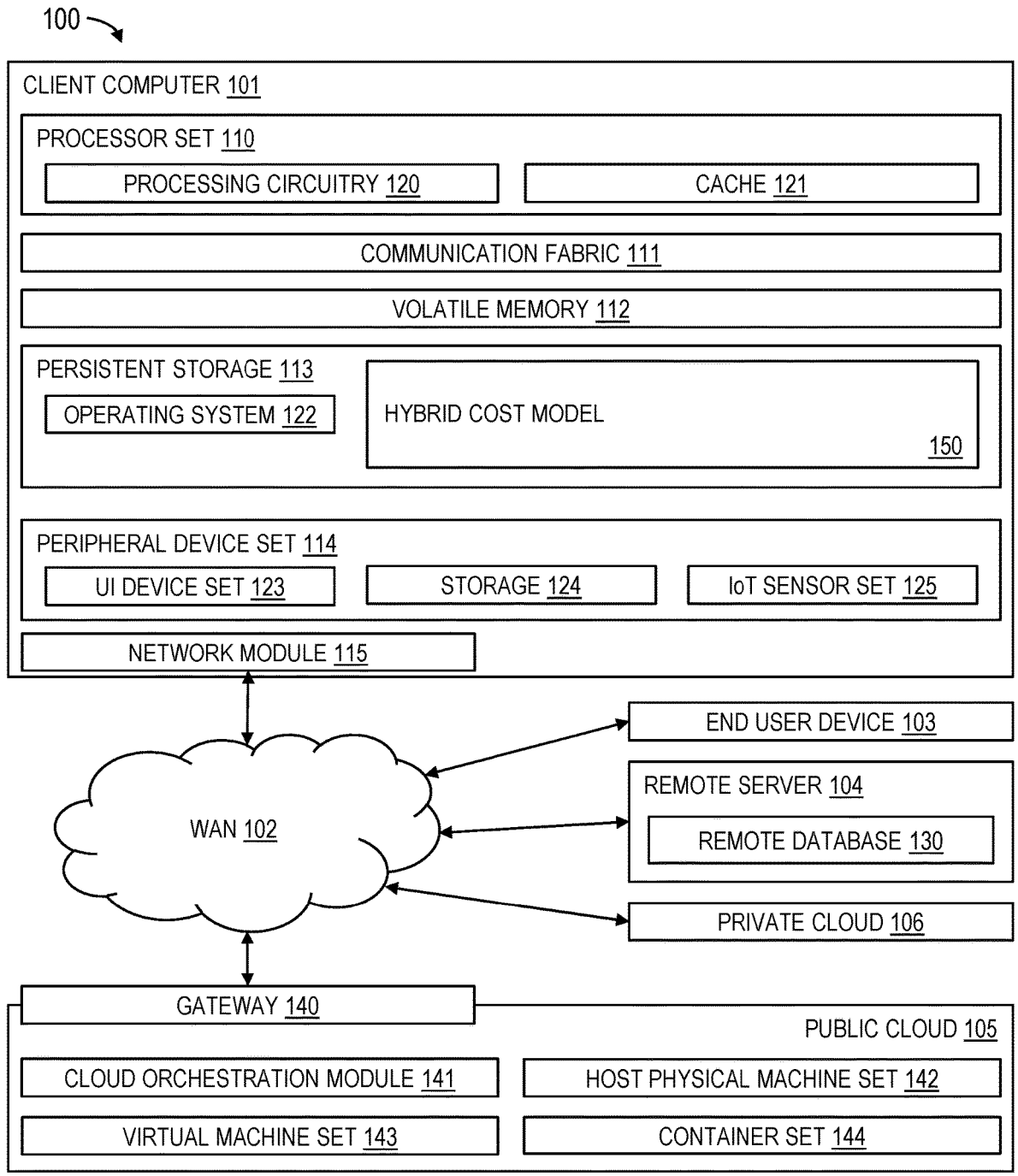
FIG. 1 depicts a block diagram of an example computing environment for use in conjunction with one or more embodiments.

The diagrams depicted herein are illustrative. There can be many variations to the diagram or the operations described therein without departing from the spirit of the disclosure. For instance, the actions can be performed in a differing order or actions can be added, deleted or modified.

In the accompanying figures and following detailed description of the described embodiments of the disclosure, the various elements illustrated in the figures are provided with two or three-digit reference numbers. With minor exceptions, the leftmost digit(s) of each reference number correspond to the figure in which its element is first illustrated.

DETAILED DESCRIPTION

Queries can be executed against a relational database using a relational database management system (RDBMS).

When a query is received by the RDBMS, a query optimizer (often itself a component/module of the RDBMS) analyzes the query and determines the most efficient execution plan. In a typical architecture, a query optimizer uses a so-called classic cost model (CCM) to evaluate several alternative query plans in its search space. The plan with the minimum estimated cost is typically selected for executing the query.

The CCM uses statistics from the underlying data, as well as environmental specifications such as hardware and concurrency settings, in making cost estimations. In many configurations, the CCM estimates the cost of each operator and accumulates the costs of all operators in the plan to estimate the total cost. To arrive at an optimal plan with the lowest total cost, the CCM relies, in particular, on the size of the data flowing through each operator, also known as the "cardinality". However, the true cardinalities are typically unknown at compile-time. Therefore, the query optimizer and/or CCM uses various methods to estimate cardinality.

The purpose of cardinality estimation is to predict the number of rows that a query is likely to process through each plan operator without executing the query plan. The query optimizer uses the result of the cardinality estimate to compute the total cost of the alternative plans and ultimately select the best one (that is, the plan with the lowest cost). Unfortunately, cardinality estimation is not always accurate, because realistic databases hardly satisfy the assumptions of independence and uniformity which are typically assumed in classic estimation methods. As a result, the CCM may lead the query optimizer to choose poor query plans.

The inaccuracy in cardinality estimates and the simplifying assumptions used in CCMs have motived an outpouring of research in the area of Machine Learning (ML) based cost estimation. ML-based models, also referred to as learned cost models (LCMs), do not rely on cardinality estimations and do not require simplifying assumptions; instead, these models estimate the cost by learning from runtime. Similar to any other ML-based methods, however, LCMs are likely to produce poor estimates when the sample is not drawn from the distribution represented by the training data. In other words, while LCMs can improve the average performance of a query optimizer, their accuracy can be poor for queries and plans that they have not seen in training. Therefore, ML-based LCMs are likely to generate poor plans if there are no mechanisms in place to handle out-of distribution samples.

This disclosure introduces new methods, computing systems, and computer program products for providing a hybrid cost model for evaluating query execution plans. Rather than relying solely on the CCM, or on an LCM, the hybrid cost model described herein leverages a meta-ensemble model, referred to herein as a query classifier, to route queries to LCMs (ML-based cost models) only when those models are expected to outperform the CCM. In some embodiments, this is achieved by training the query classifier to take queries as input and to output, for a respective query, a prediction as to which cost model (e.g., CCM, LCM 1, LCM 2, etc.) would produce the most accurate cost estimations. The query can then be routed to the corresponding model for costing the alternative plans. In this manner, the hybrid cost model can strike a balance between the available LCMs and the CCM that finds, for each query, the best performance available amongst the LCMs and CCM.

A query execution plan architecture that leverages a hybrid cost model having a query classifier in accordance with one or more embodiments described herein offers various technical advantages over prior approaches to evaluating query execution plans. Unlike prior approaches, the query classifier described herein ensures that each query is routed to the best available model for costing the alternative plans. Notably, when the available LCMs cannot outperform the CCM for a given query, that query can bypass the LCMs and fall back to a CCM-based cost estimation, meaning that edge-cases (e.g., those having out-of distribution samples) with typically poor LCM performance are natively avoided. Other advantages are possible.

For example, a set of LCMs can be trained to specialize on certain classes of queries. In this manner the LCMs and CCM can make up a collection of "base models" to handle a variety of cost estimation tasks. In some embodiments, alternative plans for each query in a training set are evaluated using each of the base models. The quality of the cost estimates generated by each model is determined by evaluating the correlation between the respective estimates and runtime. Advantageously, each query can then be labeled by the base model that produces cost estimates with the highest correlation to runtime. The query classifier (itself a sort of classification model) can then be trained on the labeled data (that is, a corpus of training query-best model pairs) to take queries as input and to predict which base model(s) would produce the best plan. In short, the hybrid cost model architecture described herein benefits from the advantage of using specially-built LCMs while minimizing regressions by falling back on the CCM when necessary. This hybrid cost model architecture proposes a query classifier that learns to route queries to a base cost model (either learned or classic) that is expected to provide estimates with a higher correlation with runtime.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 1, computing environment 100 contains an example of an environment for the execution of at least some of the computer code involved in performing the inventive methods, such as a hybrid cost model 150 (also referred to herein as block 150 or as a query plan selection module). In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
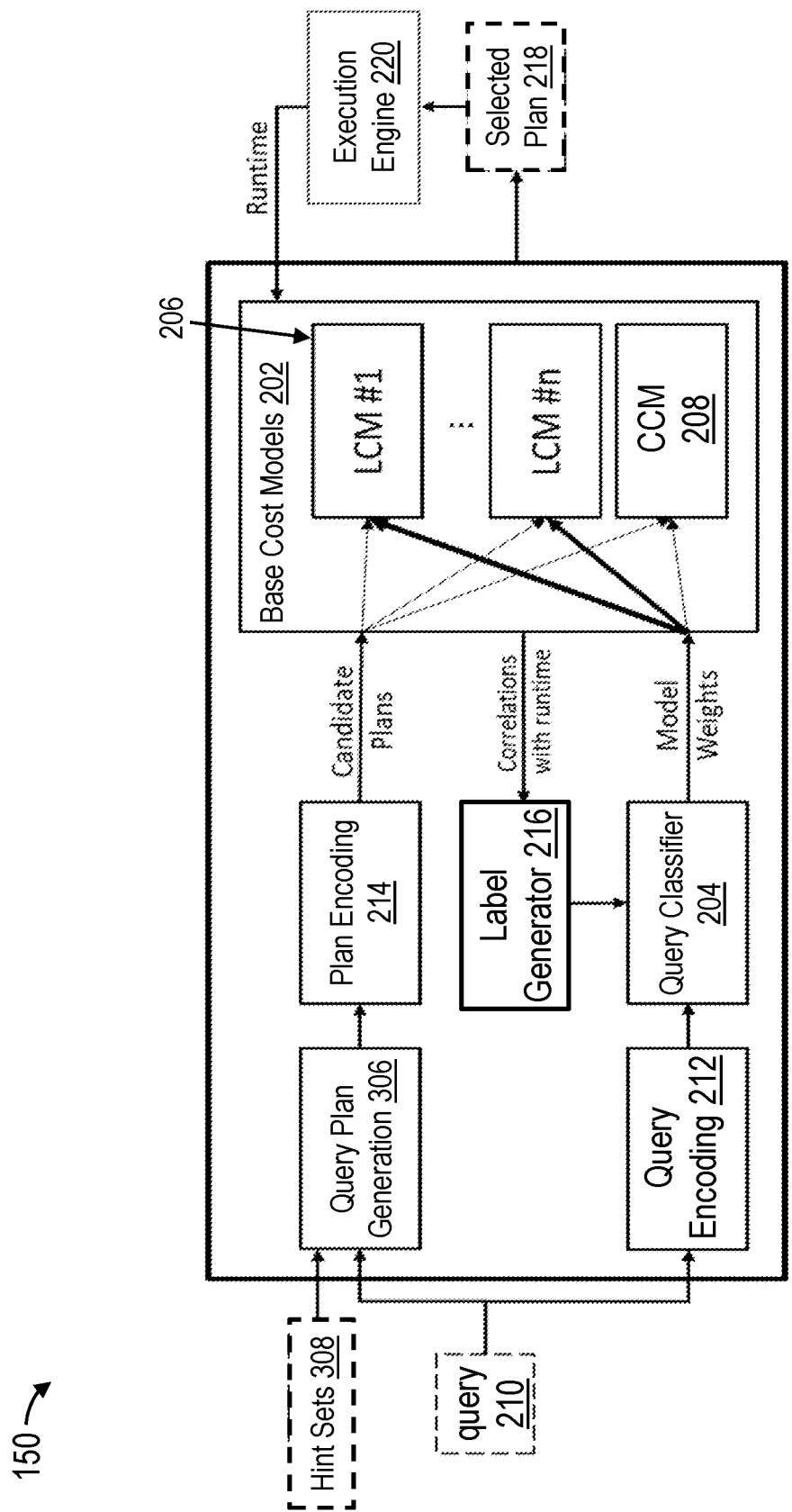
FIG. 2 depicts a block diagram of the hybrid cost model of FIG. 1 in accordance with one or more embodiments.

Systems for providing and training a hybrid cost model for evaluating query execution plans are now described with reference to FIGS. 2 and 3. FIG. 2 depicts a block diagram of components of the hybrid cost model 150 of FIG. 1 according to one or more embodiments described herein. In some embodiments, the hybrid cost model 150 includes two key components: a set of base cost models 202 and a query classifier 204. The subsequent sections elaborate on these components in greater detail.

The Learned Cost Models

In some embodiments, the base cost models 202 are composed of one or more LCMs 206 (here, LCM #1, LCM #2, . . . , LCM #n), along with a CCM 208. In some embodiments, each learned cost model of the LCMs 206 can be trained to predict plan execution times for a certain class of queries. In some embodiments, each learned cost model can be trained to predict plan execution times for a unique class of queries, although some degree of overlap between the scope of learned cost models is within the contemplated scope of this disclosure.

In some embodiments, the classes of queries can be defined based on their level of complexity (e.g., a number of join and local predicates, number and presence of aggregations, etc. define the classes), based on their coverage of the database schema (subsets of the schema define the classes), based on data statistics, based on their respective configuration, application, and/or workload characteristics, and/or a combination of these factors or other factors. Alternatively, a single learned cost model can be trained on all classes of queries (that is, "n" can be one, although this configuration is not separately shown). The choice of model granularity comes down to balancing the benefits of model specialization versus the risk of severe over-fitting to a certain class(es).

Figure 3:
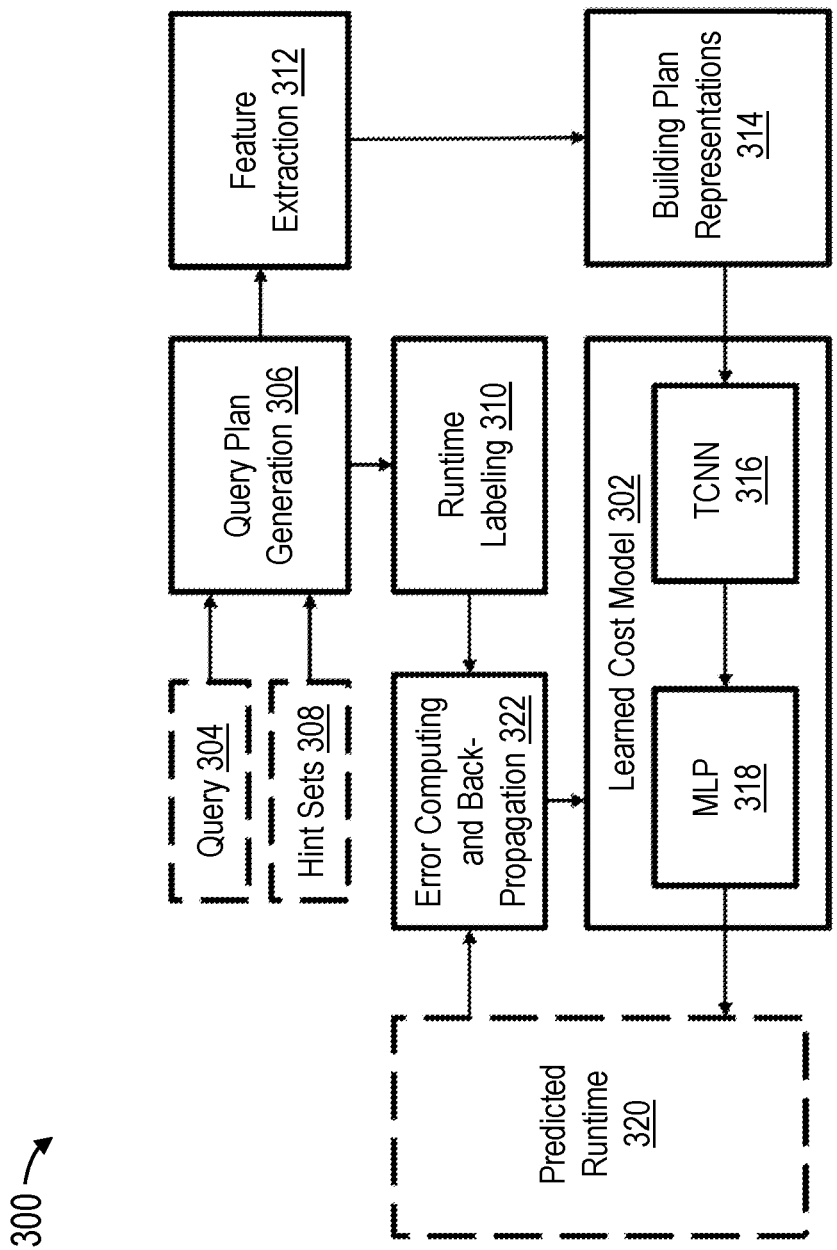
FIG. 3 depicts a block diagram of a training process for the hybrid cost model of FIG. 1 in accordance with one or more embodiments.

FIG. 3 shows a process 300 to train a learned cost model 302 (itself any or all of the LCMs 206 described with respect to FIG. 2) in accordance with one or more embodiments. As shown in FIG. 3, given a query 304 (observe that, while the following discussion is largely in view of a single query, the overall process can be repeated as described for any number of queries and such discussion is otherwise omitted for clarity), one or more potentially optimal query plans (candidate plans) can be generated via query plan generation 306 using various techniques. In some embodiments, candidate plans are generated according to (in whole or in part) hints or hint sets 308. In some embodiments, the hint sets 308 enable and/or disable certain operators in the plan (e.g. enable nested loop join, disable index access, etc.). In this manner, hint sets 308 help ensure a diversity in plans used for training in such a way that local optimums, which can potentially be the true optimum, are included in the training data. Hint sets 308 can include, for example, Hint 1: {merge join, nest loop join, hash join, index scan, table scan}, Hint 2: {merge join, nest loop join, hash join, table scan}, Hint 3: {merge join, nest loop join, hash join, index scan}, Hint 4: {nest loop join, hash join, table scan}, Hint 5: {nest loop join, hash join, index scan}, Hint 6: {nest loop join, hash join, index scan, table scan}, Hint 7: {merge join, nest loop join, table scan}, Hint 8: {merge join, nest loop join, index scan}, Hint 9: {merge join, nest loop join, index scan, table scan}, Hint 10: {nest loop join, table scan}, Hint 11: {nest loop join, index scan}, and Hint 12: {nest loop join, index scan, table scan}. Other hints are possible and within the contemplated scope of this disclosure. Note that, upon using each of these hints, the operators included in the set are enabled and other operators are disabled. In some embodiments, candidate plans are generated randomly (random plan generation). In some embodiments, candidate plans are generated using a combination of random generation, hints, and/or any other technique that can diversify the plans to be used for model training.

As further shown in FIG. 3, in the next step, the query 304 is executed using each of the generated plans, and these real execution times are collected as labels for the respective learned cost model (as shown, runtime labeling 310). Concurrently, or separately, features required to represent plan trees and to train the cost model to learn the associations between patterns in the plan trees and runtime are extracted from the query 304 (as shown, feature extraction 312). For example, in some embodiments, the query 304 is encoded into a vector(s) of numeric values that are consumable by machine learning architectures (e.g., the learned cost model 302). In some embodiments, the encoding captures information about the base tables, local predicates, join predicates, correlations, skewness of predicate columns, etc., of the query 304.

In some embodiments, the extracted features are used for plan representation (here, building plan representations 314). In some embodiments, a vectorized tree having a plurality of nodes is used as the representation of a query plan, where each node of the plan tree is or encodes a vector containing information about the operator type and the tables accessed. In some embodiments, a classic optimizer's chosen query execution plan is used to extract the operator type, cardinality estimation, and cost estimation for each node as a node feature vector. As used herein, a "classic" optimizer refers to the cost or rules-based query optimizer employed by an RDBMS. In some embodiments, a representation of each node is generated as the estimated cardinality and cost as well as a one-hot encoding of the operator types (not separately shown).

In some embodiments, the learned cost model 302 includes an architecture having multiple layers of a Tree Convolutional Neural Net (TCNN) 316, configured to receive the plans from building plan representations 314. In some embodiments, the TCNN 316 is an extension of Convolutional Neural Nets (CNNs) for processing binary tree-structured data. In some embodiments, the TCNN 316 (also referred to as the TCNN model or TCNN module) takes the vectorized plan tree as input and learns kernels that capture the relationship(s) between the parent nodes and the child nodes. In some embodiments, the TCNN 316 produces a new vectorized tree. In some embodiments, the nodes of this tree are then aggregated into a one-dimensional vector by dynamic pooling. In some embodiments, the vector produced by the TCNN module is fed to a Multilayer Perceptron (MLP) 318, which, in its final layer, predicts the execution time. Alternatively, or in addition, in some embodiments, query level information (e.g., query features from feature extraction 312) is processed using one or more fully connected layers of the MLP 318 and the resultant vector is combined with the plan level information (e.g., a plan representation from building plan representations 314) and fed to the TCNNs 316.

As further shown in FIG. 3, in some embodiments, the learned cost model 302 is trained by creating a number of plans (refer to query plan generation 306), iterating through the respective plan tree and corresponding real execution times for each plan, using the learned cost model 302 to predict the execution time given a query plan (here, the predicted runtime 320), and updating the learned cost model 302 (e.g., update weights of the layers of the MLP and/or TCNN) to reduce the difference between the real and predicted execution times. While not meant to be particularly limited, prediction accuracy can be improved, for example, using loss functions such as cross-entropy loss for classification tasks, back-propagation, and error computing (e.g., mean squared error, etc.) (jointed referred to as error computing and back-propagation 322). In some embodiments, this overall process can be repeated for any number of queries. In some embodiments, each query will share some or all of the underlying characteristics for which the respective learned cost model is being trained to target (that is, the type of query for which the respective learned cost model is optimized).

The process 300 can be repeated to train any number of learned cost models (any or all of the LCMs 206 described with respect to FIG. 2). In some embodiments, the process 300 is repeated to train multiple learned cost models, each based on application, query, and/or workload characteristics. In some embodiments, each of the learned cost models is trained based on a different combination of application, query, and/or workload characteristics.

The Query Classifier

Referring again to FIG. 2, the hybrid cost model 150 includes a query classifier 204. In some embodiments, the query classifier 204 is trained to determine which cost model of the base cost models 202 should be used for planning a given query 210.

In some embodiments, the query classifier 204 takes a representation of query-level features of a query 210 as input (here, query encoding 212), which complements information from plan-level features (here, plan encoding 214) sourced from a query plan generation module (here, query plan generation 306) with or without hint sets 308. Query and plan encoding can be completed in a similar manner as described with respect to FIG. 3. For example, in some embodiments, query encoding 212 uses the structural information of a respective query's join graph and encodes information about the tables, local predicates, join predicates, aggregations, etc. (that is, query representations are produced using a join graph structure), and plan encoding 214 encodes machine-interpretable features of each respective plan. Notably, the encoded representation of the query is agnostic to the plan (join orders and plan operators) that will be used to execute the query.

In some embodiments, a label generator 216 generates the labels required for training the query classifier 204. In some embodiments, the label generator 216 collects predicted execution times from the one or more corresponding LCM (s) 206 and the estimated cost from the CCM 208. In some embodiments, for each query (e.g., the query 210), the label generator 216 computes a correlation value or metric between the estimated value from each base model and the actual (real) runtime. For example, in some embodiments, the label generator 216 computes, for each query, the Pearson correlation between the estimated value (the predicted execution time or cost) from each base model and the actual runtime.

In some embodiments, the query classifier 204 is configured to output or otherwise identify the model of the base cost models 202 with the highest correlation with runtime as the most suitable for the respective query 210. In some embodiments, the identified model (i.e., the "best" model in this context) having the highest runtime correlation is paired to the respective query, for example in a 2-tuple. This process can be repeated for any number of queries to generate an arbitrary number of query-best model labels. In some embodiments, each query can be labeled with the respective base model having the maximum Pearson correlation among all base cost models 202.

In some embodiments, the query representations (refer to query encoding 212) and the labels (refer to label generator 216) are used to train the query classifier 204 to learn to predict the most suitable cost model for a given query. In some embodiments, a final layer of the query classifier 204 uses a SoftMax activation function, which produces a likelihood of superiority of each base model. In this manner, the output values can alternatively be used as weights. In other words, in scenarios where the query classifier 204 reports similar (within any desired threshold) predictions (scores) for two or more models, the predictions made by those models can be combined in a weighted fashion rather than simply choosing one and discarding the other.

Implementation at Runtime

In some embodiments, the trained query classifier 204 can be leveraged for optimal plan selection at runtime. To illustrate, consider an incoming query 210. Query plan generation 306 might generate 10 (or more, or fewer, as desired) candidate plans for this particular query. These 10 plans can be evaluated using the base cost models 202 (LCM #1, LCM #2, ..., LCM #n and the CCM 208) as routed via the query classifier 204 as previously described. For example, the query classifier 204 can apply pre-trained model weights to the set of "selected plans" that each model thinks is the "best" plan (that is, the plan having the most optimal query execution metrics among the candidate plans) to identify a selected plan 218. In some embodiments, the selected plan 218 can then be executed using an execution engine 220 and, advantageously, the query 210 can thus be resolved using the plan selected by the most correlated (accurate) LCM, CCM, or weighted combination of LCMs and CCMs.

New Learned Cost Model Identification

Observe that any time the CCM 208 is selected as the best model (meaning that the CCM 208 is predicted to outperform the LCMs 206), the practical meaning is that the current selection of LCMs 206 was not able to handle the particulars of the respective query. In some embodiments, this scenario is treated as an edge case for identifying opportunities for new LCMs. For example, in some embodiments, one or more features of the encoded queries and/or respective plans are used to train a new, dedicated LCM for this particular type of query (refer to FIG. 3). In this manner, the selection of LCMs will increase over time to accommodate an ever-increasing range of queries without needing to fall back to the CCM 208.

Figure 4:
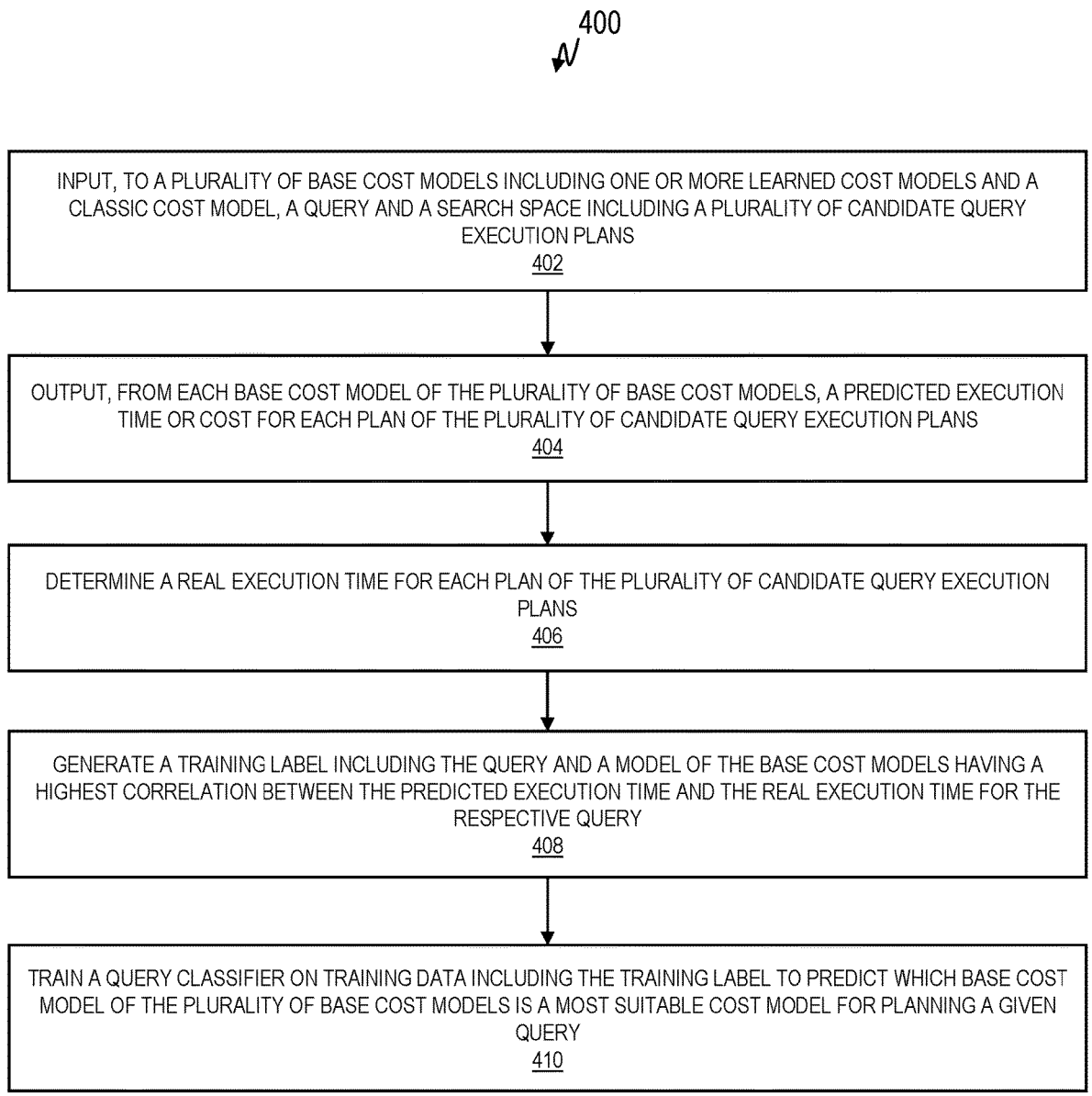
FIG. 4 is a flowchart in accordance with one or more embodiments of the present disclosure.

Referring now to FIG. 4, a flowchart 400 for evaluating query execution plans using a hybrid cost model is generally shown according to an embodiment. The flowchart 400 is described in reference to FIGS. 1-3 and may include additional blocks not depicted in FIG. 4. Although depicted in a particular order, the blocks depicted in FIG. 4 can be rearranged, subdivided, and/or combined. In exemplary embodiments, the method 400 can be performed by a computing environment (e.g., computing environment 100 shown in FIG. 1).

At block 402, the method includes inputting, to a plurality of base cost models including one or more learned cost models and a classic cost model, a query and a search space including a plurality of candidate query execution plans. In some embodiments, the learned cost models are trained to estimate, for an input comprising a query and one or more plans, an execution time for each plan. In some embodiments, the classic cost model is configured to calculate the expected execution cost based on the estimated cardinalities and other characteristics of an input query plan's operators.

In some embodiments, each of the one or more learned cost models are trained to predict plan execution times for a specific class of queries. In some embodiments, the specific class of queries is defined based on at least one of a level of complexity, data statistics, a coverage of the database schema, configuration, application and workload characteristics, and a combination thereof.

At block 404, the method includes outputting, from each base cost model of the plurality of base cost models, a predicted execution time or cost for each plan of the plurality of candidate query execution plans.

At block 406, the method includes determining a real execution time for each plan of the plurality of candidate query execution plans.

In some embodiments, the method includes determining, for each predicted execution time for each plan made by each base cost model, a correlation metric between the predicted execution time and the real execution time. In some embodiments, the correlation metric includes a Pearson correlation between the respective predicted execution time or cost and the real execution time.

In some embodiments, the method includes ordering the determined correlation metrics to identify the model of the base cost models having a highest correlation between the predicted execution time and the real execution time for the respective query.

At block 408, the method includes generating a training label including the query and a model of the base cost models having a highest correlation between the predicted execution time and the real execution time for the respective query. In some embodiments, this process is repeated for any number of queries to generate a corpus for training labels (that is, to generate training data of any desired size).

At block 410, the method includes training a query classifier on training data including the training label to predict which base cost model of the plurality of base cost models is a most suitable cost model for planning a given query.

In some embodiments, the method includes receiving, at runtime, a new query. In some embodiments, the method includes selecting, using the trained query classifier, the most suitable cost model of the plurality of base cost models for planning the new query.

In some embodiments, the method includes executing the new query against a database using an optimal plan selected by the most suitable cost model.

Various embodiments of the disclosure are described herein with reference to the related drawings. Alternative embodiments of the disclosure can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for evaluating query execution plans, the method comprising:
inputting, to a plurality of base cost models comprising a plurality of learned cost models and a classic cost model, a query and a search space comprising a plurality of candidate query execution plans, wherein the plurality of learned cost models are trained to estimate, for an input comprising a query and one or more plans, an execution time for each plan, wherein each of the plurality of learned cost models is separately trained to predict plan execution times for a unique query class of a plurality of query classes, wherein each of the plurality of query classes is defined based on at least one of: a level of complexity, a coverage of a database schema, data statistics, configuration, application, and workload characteristics, or a combination thereof, and wherein the classic cost model is configured to estimate an execution cost based on cardinalities of an input query plan's operators;
outputting, from each base cost model of the plurality of base cost models, a predicted execution time or cost for each plan of the plurality of candidate query execution plans;
determining a real execution time for each plan of the plurality of candidate query execution plans;
generating a training label comprising the query and a model of the base cost models having a highest correlation between the predicted execution time and the real execution time for the respective query; and
training a query classifier on training data comprising the training label to predict which base cost model of the plurality of base cost models is a most suitable cost model for planning a given query.

2. The computer-implemented method of claim 1, further comprising:
receiving, at runtime, a new query; and
selecting, using the trained query classifier, the most suitable cost model of the plurality of base cost models for planning the new query.

3. The computer-implemented method of claim 2, further comprising executing the new query against a database using an optimal plan selected by the most suitable cost model.

4. The computer-implemented method of claim 1, further comprising determining, for each predicted execution time for each plan made by each base cost model, a correlation metric between the predicted execution time and the real execution time, wherein the correlation metric comprises a Pearson correlation between the respective predicted execution time or cost and the real execution time.

5. The computer-implemented method of claim 4, further comprising ordering the determined correlation metrics to identify the model of the base cost models having a highest correlation between the predicted execution time and the real execution time for the respective query.

6. A system having a memory, computer readable instructions, and one or more processors for executing the computer readable instructions, the computer readable instructions controlling the one or more processors to perform operations comprising:
inputting, to a plurality of base cost models comprising a plurality of learned cost models and a classic cost model, a query and a search space comprising a plurality of candidate query execution plans, wherein the plurality of learned cost models are trained to estimate, for an input comprising a query and one or more plans, an execution time for each plan, wherein each of the plurality of learned cost models is separately trained to predict plan execution times for a unique query class of a plurality of query classes, wherein each of the plurality of query classes is defined based on at least one of: a level of complexity, a coverage of a database schema, data statistics, configuration, application, and workload characteristics, or a combination thereof, and wherein the classic cost model is configured to estimate an execution cost based on cardinalities of an input query plan's operators;
outputting, from each base cost model of the plurality of base cost models, a predicted execution time or cost for each plan of the plurality of candidate query execution plans;
determining a real execution time for each plan of the plurality of candidate query execution plans;
generating a training label comprising the query and a model of the base cost models having a highest correlation between the predicted execution time and the real execution time for the respective query; and
training a query classifier on training data comprising the training label to predict which base cost model of the plurality of base cost models is a most suitable cost model for planning a given query.

7. The system of claim 6, the operations further comprising:
receiving, at runtime, a new query; and
selecting, using the trained query classifier, the most suitable cost model of the plurality of base cost models for planning the new query.

8. The system of claim 7, the operations further comprising executing the new query against a database using an optimal plan selected by the most suitable cost model.

9. The system of claim 6, the operations further comprising determining, for each predicted execution time for each plan made by each base cost model, a correlation metric between the predicted execution time and the real execution time, wherein the correlation metric comprises a Pearson correlation between the respective predicted execution time or cost and the real execution time.

10. The system of claim 9, the operations further comprising ordering the determined correlation metrics to identify the model of the base cost models having a highest correlation between the predicted execution time and the real execution time for the respective query.

11. A computer program product comprising a computer readable storage medium having program instructions embodied therewith, the program instructions executable by one or more processors to cause the one or more processors to perform operations comprising:

inputting, to a plurality of base cost models comprising a plurality of learned cost models and a classic cost model, a query and a search space comprising a plurality of candidate query execution plans, wherein the plurality of learned cost models are trained to estimate, for an input comprising a query and one or more plans, an execution time for each plan, wherein each of the plurality of learned cost models is separately trained to predict plan execution times for a unique query class of a plurality of query classes, wherein each of the plurality of query classes is defined based on at least one of: a level of complexity, a coverage of a database schema, data statistics, configuration, application, and workload characteristics, or a combination thereof, and wherein the classic cost model is configured to estimate an execution cost based on cardinalities of an input query plan's operators;

outputting, from each base cost model of the plurality of base cost models, a predicted execution time or cost for each plan of the plurality of candidate query execution plans;

determining a real execution time for each plan of the plurality of candidate query execution plans;

generating a training label comprising the query and a model of the base cost models having a highest correlation between the predicted execution time and the real execution time for the respective query; and training a query classifier on training data comprising the training label to predict which base cost model of the plurality of base cost models is a most suitable cost model for planning a given query.

12. The computer program product of claim 11, the operations further comprising:

receiving, at runtime, a new query; and selecting, using the trained query classifier, the most suitable cost model of the plurality of base cost models for planning the new query.

13. The computer program product of claim 12, the operations further comprising executing the new query against a database using an optimal plan selected by the most suitable cost model.

14. The computer program product of claim 11, the operations further comprising determining, for each predicted execution time for each plan made by each base cost model, a correlation metric between the predicted execution time and the real execution time, wherein the correlation metric comprises a Pearson correlation between the respective predicted execution time or cost and the real execution time.

* * * * *